(12) United States Patent
Hilton (10) Patent No.: US 10,875,111 B2
(45) Date of Patent: *Dec. 29, 2020

(54) METHOD OF USING A DEVICE TO VENTILATE A BURNING BUILDING

(71) Applicant: Tactical Ventilation Solutions Limited, Norwich (GB)

(72) Inventor: Simon James Hilton, Norwich (GB)

(73) Assignee: TACTICAL VENTILATION SOLUTIONS LIMITED, Norwich (GB)

( * ) Notice: Subject to any disclaimer, the term of this patent is extended or adjusted under 35 U.S.C. 154(b) by 512 days.

This patent is subject to a terminal disclaimer.

(21) Appl. No.: 14/778,819

(22) PCT Filed: Jan. 6, 2014

(86) PCT No.: PCT/EP2014/050071
§ 371 (c)(1),
(2) Date: Sep. 21, 2015

(87) PCT Pub. No.: WO2014/139688
PCT Pub. Date: Sep. 18, 2014

(65) Prior Publication Data
US 2016/0039020 A1 Feb. 11, 2016

(30) Foreign Application Priority Data

Mar. 13, 2013 (GB) .................................. 1304483.9

(51) Int. Cl.
*A62B 3/00* (2006.01)
*A62C 3/00* (2006.01)
(Continued)

(52) U.S. Cl.
CPC ............ *B23D 57/0084* (2013.01); *A62B 3/00* (2013.01); *A62C 3/00* (2013.01); *A62C 99/009* (2013.01);
(Continued)

(58) Field of Classification Search
CPC B23D 57/0084; B23D 45/003; B23D 45/028; B23D 45/143; B23D 45/146;
(Continued)

(56) References Cited

U.S. PATENT DOCUMENTS 4,433,871 A * 2/1984 Bertrand ................ B28D 1/045
173/191
4,572,303 A * 2/1986 Marechal ............ B27B 17/0091
173/39

(Continued)

FOREIGN PATENT DOCUMENTS

DE 42 17 790 A1 * 12/1993 ........... B23D 57/026
DE 10 2006 009 178 9/2006
(Continued)

OTHER PUBLICATIONS

Machine translation of the description of WO 2012/116825.*
(Continued)

*Primary Examiner* — Clark F Dexter
(74) *Attorney, Agent, or Firm* — Brinks Gilson & Lione; John C. Freeman (57) ABSTRACT

A device for ventilating a burning building that includes, a chassis; and a cutting assembly, mounted on the chassis. The cutting assembly is adapted to cut a ventilation hole in a roof or wall member of a building either autonomously or under remote control by an operator to allow smoke and/or hot gases to escape from the roof space.

1 Claim, 9 Drawing Sheets

(51) Int. Cl.
  *A62C 27/00*   (2006.01)
  *B23D 45/00*   (2006.01)
  *B23D 45/02*   (2006.01)
  *B23D 45/14*   (2006.01)
  *B23D 57/00*   (2006.01)
  *B23D 57/02*   (2006.01)
  *B23D 59/00*   (2006.01)
  *B27B 5/10*    (2006.01)
  *A62C 99/00*   (2010.01)
  *A62C 3/02*    (2006.01)

(52) U.S. Cl.
  CPC ......... *B23D 45/003* (2013.01); *B23D 45/028* (2013.01); *B23D 45/143* (2013.01); *B23D 57/026* (2013.01); *B23D 59/001* (2013.01); *B27B 5/10* (2013.01); *A62C 3/0207* (2013.01); *A62C 27/00* (2013.01); *Y10S 83/928* (2013.01)

(58) Field of Classification Search
  CPC ...... B23D 57/026; B23D 59/001; A62B 3/00; A62B 3/005; A62C 3/00; A62C 3/0207; A62C 27/00; A62C 99/009; B27B 5/10; Y10S 83/928; Y10T 83/7189
  USPC .......................... 30/379, 379.5; 83/808, 928
  See application file for complete search history.

(56) References Cited

U.S. PATENT DOCUMENTS

| | | | | |
|---|---|---|---|---|
| 4,792,190 A | * | 12/1988 | Bertrand | B28D 1/045 299/41.1 |
| 4,832,412 A | * | 5/1989 | Bertrand | B28D 1/045 125/14 |
| 5,676,125 A | * | 10/1997 | Kelly et al. | B28D 1/045 125/13.03 |
| 6,158,817 A | * | 12/2000 | Bertrand | B28D 1/045 299/36.1 |
| 6,582,026 B2 | * | 6/2003 | Bertrand | B28D 1/045 125/13.03 |
| 6,968,877 B1 | | 11/2005 | Stokkeland | |
| 8,955,505 B2 | * | 2/2015 | Jonsson | B23D 59/008 125/21 |
| 2002/0139234 A1 | | 10/2002 | Inouye et al. | |
| 2006/0230893 A1 | * | 10/2006 | Brooks | A01G 3/002 83/13 |
| 2009/0229708 A1 | * | 9/2009 | Quigg | A01G 23/003 144/4.1 |
| 2015/0094859 A1 | * | 4/2015 | Awerbuch et al. | B23D 47/08 700/275 |
| 2016/0207598 A1 | * | 7/2016 | Wiggins et al. | B63G 8/001 |

FOREIGN PATENT DOCUMENTS

| | | | |
|---|---|---|---|
| FR | 2 922 240 | 4/2009 | |
| WO | WO 03/101687 A1 * | 12/2003 | ........... B23D 45/143 |
| WO | WO 2012/105904 A1 * | 8/2012 | ........... B23D 59/008 |
| WO | WO 2012/116825 A1 * | 9/2012 | ........... B23D 57/026 |
| WO | WO 2012/154718 | 11/2012 | |

OTHER PUBLICATIONS

Machine translation of the claims of WO 2012/116825.*
PCT/EP2014/050071 International Search Report dated Nov. 17, 2014 (5 pages).
PCT/EP2014/050071 Written Opinion dated Nov. 17, 2014 (6 pages).
PCT/EP2014/050071 International Preliminary Report on Patentability dated Sep. 15, 2015 (7 pages).

* cited by examiner

METHOD OF USING A DEVICE TO VENTILATE A BURNING BUILDING

This application claims priority to International Application No. PCT/EP2014/050071 filed Jan. 6, 2014, and Great Britain Application No. 1304483.9 filed Mar. 13, 2013; the entire contents of each are incorporated herein by reference.

FIELD OF THE INVENTION

The invention relates to apparatus and methods for providing emergency ventilation to buildings, and especially buildings that are on fire.

BACKGROUND AND PRIOR ART

When tackling a fire in a building it is often required to provide quick, emergency ventilation to a roof, to allow hot gases and smoke from within the roof space to escape, to prevent the further spread of fire along a building and reduce safety hazards caused by smoke. Such ventilation may be obtained by making a hole in the roof structure (or in a side-wall structure); this exhaust/outlet vent is typically called a "tactical ventilation hole". Many roof and wall structures are encountered, and in commercial buildings roofs are often of a steel laminated construction, comprising outer steel panels with an inner filling of insulating materials.

In domestic fires, in houses with e.g. slate or tile roofs, firefighters often gain access to the roof by a ladder or platform, and manually create a hole in the roof by removing roof tiles or slates, and cutting through any roofing felt below. This approach is not without risk, and is not possible with roof constructions encountered on commercial buildings. In some instances, firefighters have been deployed directly onto roof structures in an attempt to cut holes in the roof by use of equipment such as chainsaws, but such approaches are extremely dangerous, especially when the roof structure has been weakened by the action of the fire. Firefighters have lost their lives in attempting such operations.

It is amongst the objects of the present invention to provide equipment and methods for such tactical ventilation that seek to overcome the dangers currently faced by firefighters.

SUMMARY OF THE INVENTION

Accordingly, the invention provides a device for ventilating a burning building, said device comprising: a chassis; and a cutting assembly, mounted on said chassis, said cutting assembly being adapted to cut a ventilation hole in a roof or wall member of said building either autonomously or under remote control by an operator.

Remote control of the device may be achieved by a control signal cable running from the device to a remotely-located operator, or by wireless means such as radio communication.

Preferably said cutting assembly comprises a cutter that may be moved between a first and second orientation to enable the direction of cut relative to said chassis to be controlled. In this way, cutters that predominantly cut in a straight line may be used to form a polygonal hole in a roof structure. Embodiments are described that use a pair of cutters that may be oriented and operated sequentially in two non-parallel orientations to form a quadrilateral (e.g. square or rhomboid) hole. Single cutters may also be used and oriented/operated sequentially in a plurality of orientations to create overlapping cuts to form other polygonal holes. Triangular holes may be formed in this fashion, requiring the fewest number of straight cuts to form a tactical ventilation hole.

Alternatively, said assembly comprises a circular cutter, rotatable on an axis substantially perpendicular to a roof or wall member to be cut.

In particularly-preferred embodiments said cutting assembly comprises a chain saw mounted for rotational displacement with respect to said chassis on an axis substantially perpendicular to a roof member to be cut, thereby allowing a circular hole to be cut in a roof of a building.

In yet further preferred embodiments, said cutting assembly comprises two chain saws mounted for rotational displacement with respect to said chassis on an axis substantially perpendicular to a roof member to be cut, and wherein said chain saws are mounted opposite each other on the circle of rotation. In this way, when a circle of roof material is cut by the saws, the circle is supported on opposite sides whilst the cut is progressing. This prevents the weight of the cut circle of roof material from folding downwards and pinching the chain saw blade.

In any aspect of the invention it is preferred that said cutting assembly may be moved from a first position substantially within the footprint of said chassis to a second position where said cutter operates outside the footprint of the chassis. Preferably said movement is a hinged movement about an axis substantially parallel to a roof or wall to be cut. This allows the cutter to cut an adjacent roof section at a different orientation to a portion of roof on which the device's chassis is positioned, for example a vertical wall-section adjacent a roof section.

In other preferred embodiments the cutting assembly may be moved between the first and second positions in a sliding fashion, for example by a telescopic or sliding mechanism such as a rack and pinion drive or a hydraulic ram. The use of such a mechanism leads to increased stability of the unit due to maintaining an approximately constant and relatively low centre of gravity during deployment of the cutting assembly.

In any aspect of the invention it is preferred that said chassis further comprises a drive mechanism adapted for driving engagement with a roof surface. This allows the device to be positioned or repositioned, preferably remotely, at different locations on a roof surface. Preferably, said drive mechanism comprises a continuous band tread. More preferably, said continuous band tread comprises magnetic elements, thereby improving grip on a magnetically-susceptible roof surface.

Where a drive mechanism is not provided, the device may be equipped with a roof-engaging component, such as spaced-apart skids, on either side of the cutting mechanism. Such skids may also be provided with elements to improve grip on the roof, such as high-friction regions, or magnetic elements.

If a drive mechanism is not used, then the unit may simply be placed on a roof structure (e.g. by lifting it with a crane) at a position where a tactical ventilation hole is required. In any aspect of the invention a suitable lifting attachment point (such as a hook or loop) is provided on the device to allow it to be lifted in such a fashion.

In embodiments of the device, and especially where the device is intended to be able to operate on sloping roof surfaces, a ridge-engaging element such as a ridge hook may be provided to attach the device to the ridge of such a roof by means of a tether, such as a cable.

In any aspect of the invention it is preferred that the device further comprises a roof-engaging stabiliser. Preferably, said stabiliser comprises an electromagnet, thereby allowing the engagement with the roof to be reversibly controlled, preferably remotely.

Alternatively, said stabiliser comprises a spike.

In any aspect of the invention it is preferred that said device further comprises a retaining mechanism to retain a portion of roof or wall material cut free by said device. Preferably, said retaining mechanism is configured to remove said portion from a roof or wall, thereby opening a ventilation hole.

Also in any aspect of the invention it is preferred that said device further comprises a means to deliver a cooling fluid to said cutting mechanism.

In any aspect of the invention, it is preferred that the depth of cut of the or each cutter is controllable, preferably remote controllable. In this way, an operator may adjust the cutting action to ensure a hole is formed as required dependant on the particular roof structure encountered and the presence of any further features (such as pipes and cables) that might need to be avoided below the roof surface.

Also in any aspect of the invention, a ridge-engaging hook may be provided to allow the unit to engage with a portion of the ridge of a sloping roof to assist in keeping the device in position.

The invention also provides a method of ventilating a burning building comprising the step of positioning a device according to the present disclosure on the roof of said building and causing said device to form a hole therein.

Also included within the scope of the invention is a device or method substantially as described herein, with reference to and as illustrated by any appropriate combination of the accompanying drawings.

BRIEF DESCRIPTION OF THE FIGURES

The invention will be described with reference to the accompanying drawings, in which.

DESCRIPTION OF PREFERRED EMBODIMENTS

In essence, the invention provides an apparatus that may be lowered onto a roof by use e.g. of a crane, and that has the means to cut a hole in the roof or wall structure remotely, thereby providing increased safety for the firefighters operating the equipment. A number of different situations are envisioned, with varying roof pitches and materials of constructions, and various embodiments of the invention are described herein that have particular advantages in such different situations.

The apparatus would, in any of its embodiments be self-powered, for example by use of an internal combustion engine or by an electrically-powered motor. The power source(s) are used to operate cutting equipment, and to allow the apparatus to be remotely positioned on the roof surface. A combination of electrical and internal combustion power may be used.

In preferred embodiments of the invention, the device may be lowered onto a roof, and caused to position itself where a tactical ventilation hole is required by means of a drive mechanism, such as a track system, and preferably a steerable track system. Once in position, a cutting mechanism is actuated to cut a hole through the roof or wall structure by means of a powered saw, such as a circular saw, a reciprocating saw, a circular hole-boring saw or a chain saw. In preferred embodiments of the invention, a mechanism is provided to grip or otherwise hold the portion of roof to be cut away and then to remove that portion from the plane of the roof after cutting, in order to allow the required ventilation to take place. Such a mechanism can be provided in the form of e.g. a piercing screw that is driven into the roof structure, a magnet (and especially an electromagnet) that can attach to a steel roof portion, or a piercing bolt and hook mechanism that may be propelled through the roof structure.

A number of variants of cutting mechanism may be deployed to achieve the required ventilation. In some embodiments described, a circular saw mechanism may be used. These types of saws produce an essentially straight cut in material, and to achieve the formation of a ventilation hole, the saw may be repositioned with respect to the roof surface and a number of cuts made to define a polygonal hole. The re-alignment may be achieved by moving the orientation and position of the saw blade with respect to the rest of the device, which itself may remain essentially stationary on the roof surface. Alternatively, the device itself may move across the roof surface, causing the saw blade to make a number of cuts, again thereby forming a polygonal ventilation hole.

In other embodiments, a more linear "chain saw" may be employed. These have the advantage that they can be manoeuvred to cut in a more curving path, and so can be manipulated by e.g. a rotational mounting to cut a circular or e.g. elliptical hole. These form of saws may be used in any of the embodiments described herein (e.g. in place of circular saws). The use of a narrow, reciprocating blade can also be employed to create such a hole.

In order to facilitate movement of the device on a roof surface, a track system is preferred (rather than e.g. wheels) to improve the grip on the roof surface. The grip may be further enhanced by providing high friction regions on the track (e.g. rubber or an equivalent synthetic polymer). Where the device is likely to be used on steel, or other magnetically responsive roof surfaces, then magnetic regions may also (or alternatively) be provided on the tracks.

Once the device is positioned where the tactical ventilation hole is required, it is particularly advantageous to secure it there to prevent movement in the face of the forces created during the cutting operation. To achieve this, an anchoring system is preferably provided. This can take the form of a magnetic anchor (for use on magnetically-responsive roofs) such as a remotely operable electromagnet or a mechanically-positionable permanent magnet that may be brought reversibly into operative contact with a roof surface. Alternatively, a piercing anchor may be used to secure the device in position.

Various elements and embodiments of the invention are described in the accompanying drawings, and individual features of each illustration may be used in conjunction with other features illustrated in other embodiments.

Figures 1A, 1B, 1C, 1D:
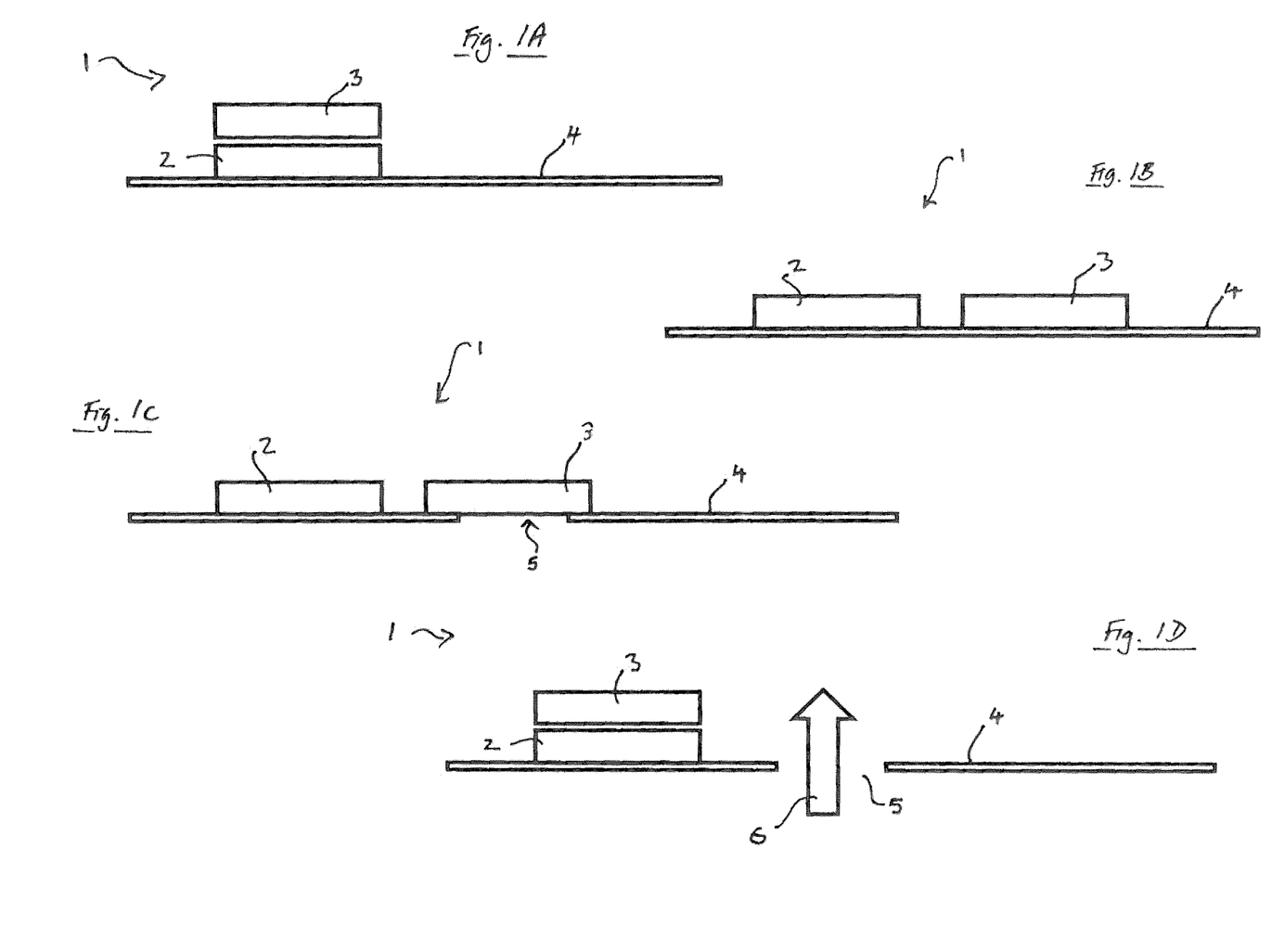
FIGS. 1A-1D show, schematically, the operation of a device of the invention.

FIG. 1 A-D shows a schematic illustration of an embodiment of a device (generally indicated by 1) for ventilating a burning building. The device comprises a chassis member 2 and a cutting assembly 3, operatively connected to each other. The device 1 may be lowered onto a roof surface 4 in preparation for forming a tactical ventilation hole. In this illustration, the roof is shown in a horizontal orientation, but it will be appreciated that in most circumstances the roof surface will be sloping. In FIG. 1 B, the cutting assembly 3 has been remotely (or automatically) moved to a position adjacent the chassis member 2, in preparation for cutting. In FIG. 1 C, the cutting assembly 3 has been actuated to form a hole 5 in the roof surface 4. Finally, in FIG. 1 D, the cutting assembly 3 has been returned to its original position on the chassis 2 to allow hot gases and smoke 6 to vent through the hole 5.

Figure 2A:
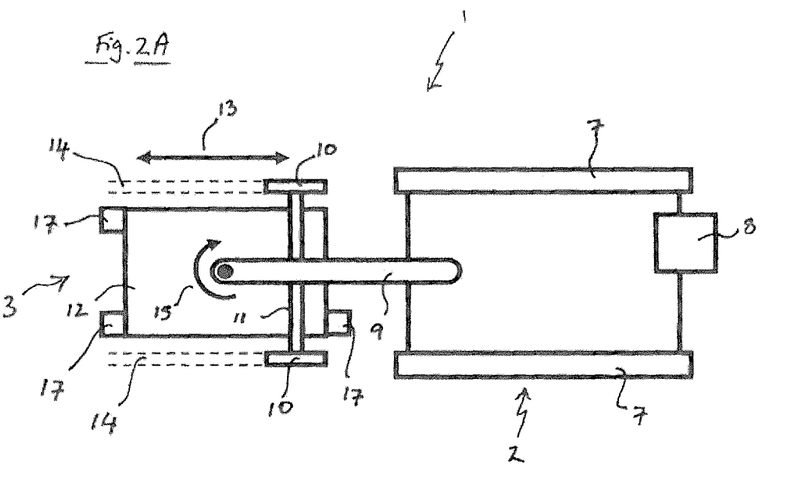
FIGS. 2A-2B show plan views of a device of the invention.

FIG. 2A illustrates in plan view, a device of the present invention, generally indicated by 1. The device comprises a chassis member 2 and a cutting assembly 3. In this embodiment, the chassis is provided with a drive track system comprising two tracks 7 mounted on each side of the chassis 2. A power source 8 for driving the tracks (and thereby providing translational movement of the chassis) is also provided. The cutting assembly 3 is mounted on the chassis by means of a moveable arm 9 that allows the cutting assembly 3 to be moved from a first position, generally within the footprint of the chassis 2, to a second deployed position (as illustrated in FIG. 2A) where the cutting assembly 3 is adjacent the chassis 2. The arm may be configured to provide this movement by translational movement, or e.g. by movement about a hinge. In this embodiment, the cutting assembly comprises a cutter in the form of two circular saw blades 10 mounted for driven rotation about an axis generally parallel to the surface of a roof 4 to be cut. The saw blades 10 may be driven on a common axle 11 as illustrated, or may be independently powered. In this embodiment, the cutter is mounted for translational movement relative to the body 12 of the cutting assembly 3 in the direction shown by the arrow 13 thereby allowing a pair of parallel cuts 14 to be formed in a roof surface.

Figure 2B:
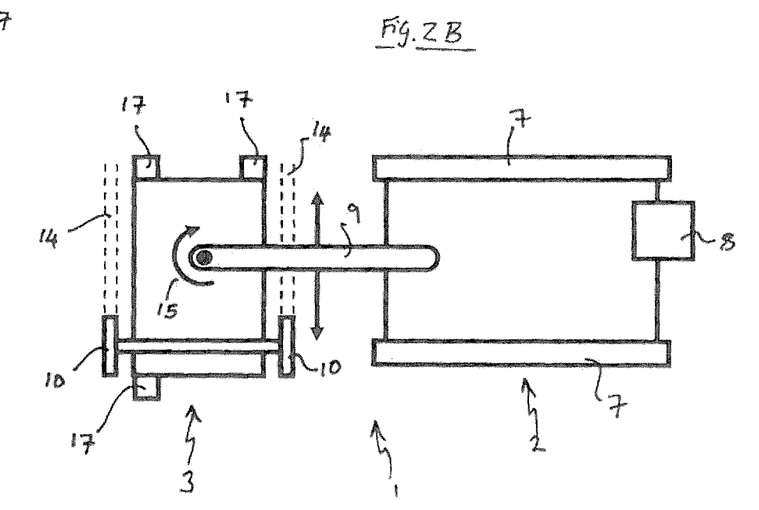

In this embodiment, the cutting assembly 3 is mounted for rotational movement about the arm 9 in indicated by the arrow 15. In this way, once the first pair of cuts have been made in the roof structure, the cutting assembly may be raised to clear the saw blades from the plane of the roof into a second position, e.g. as illustrated in FIG. 2B. The saw blades 10 may then be activated once more, moved vertically into position for cutting through the roof and then moved in a translational fashion to form a second pair of cuts 14, intersecting the first pair.

Figure 3:
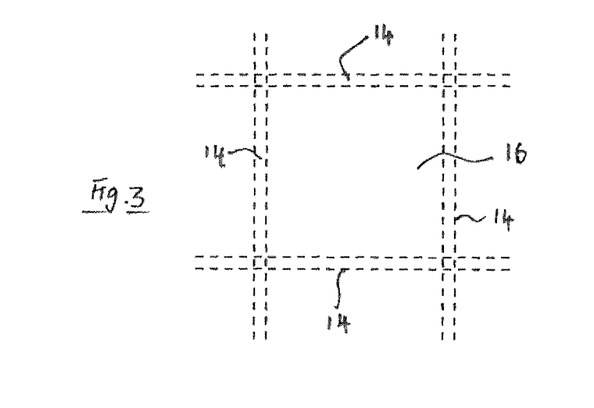
FIG. 3 illustrates a ventilation hole cut by a device of the invention.

The resulting cut pattern, illustrated in FIG. 3, creates a central section of roof 16 that can e.g. be allowed to fall into the building to create a ventilation hole 5, or may be actively removed by the device.

Also illustrated in FIGS. 2A and 2B are roof-engaging stabilisers 17 to reversibly anchor the cutting assembly 3 to the roof structure during the cutting operation.

Figure 4:
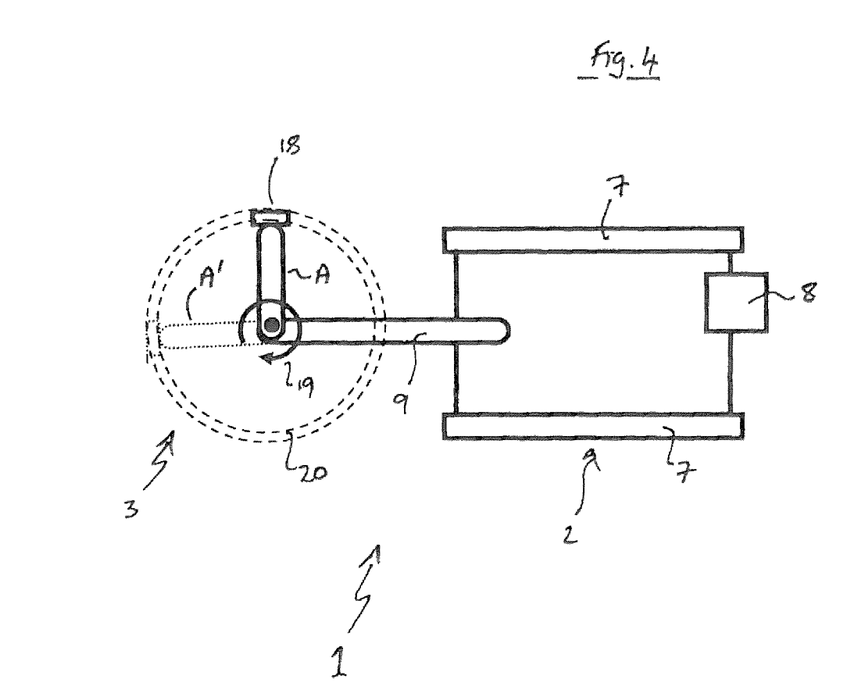
FIG. 4 shows a plan view of an alternative device of the invention.

FIG. 4 illustrates a further embodiment of a device of the present invention, generally indicated by 1, that employs a different cutting mechanism. This embodiment again comprises a chassis member 2 provided with tracks 7 of a track drive and a power supply 8. An arm 9 connects the chassis 2 to the cutting assembly 3. In this embodiment the cutting assembly comprises a cutter 18 mounted for rotational movement relative to a point on the roof surface as illustrated by the arrow 19. The cutter itself may comprise a small-diameter circular saw, a chainsaw or e.g. a reciprocating saw that is able to cut in a curved path. Rotation of the cutter 18 about a point on the arm 9 causes it to move along a generally circular path (positions A and A' are shown) to create a generally circular cut 20 in a roof surface, thereby creating a hole. As before, the plug of roof material cut out to form the hole may be allowed to fall into the building, or may be retained and removed by the device.

Figure 5A:
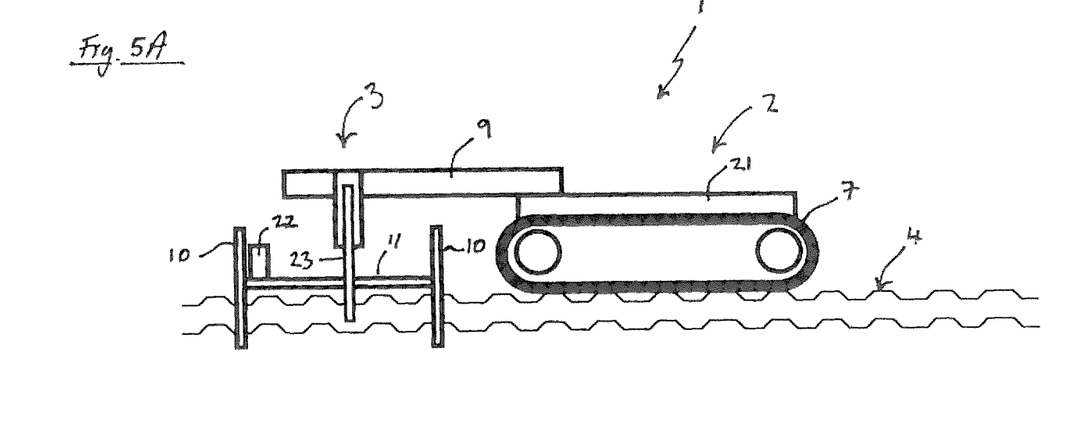
FIGS. 5A-5B and 6A-6B show side views of embodiments of devices of the invention.
Figure 5B:
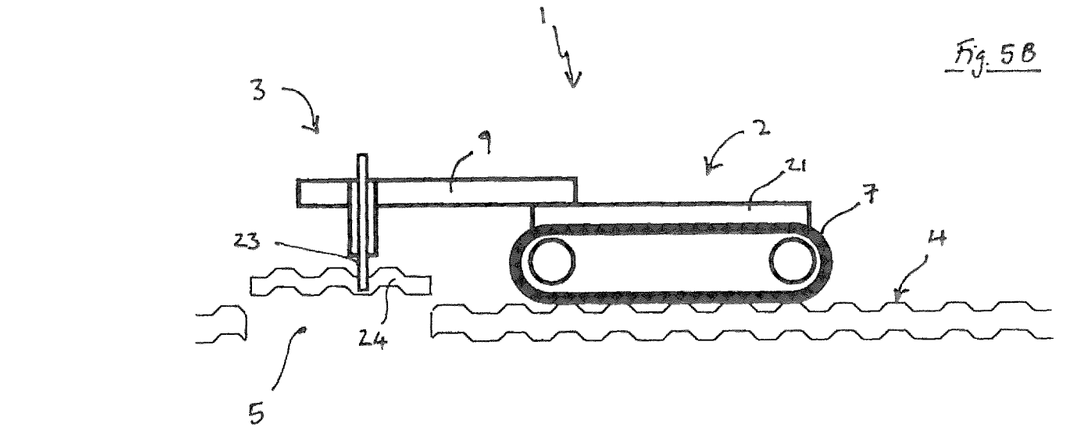

FIGS. 5A and 5B illustrate, in cross-sectional view, an embodiment of a device of the invention, generally indicated by 1. The features and operation of this embodiment are equivalent to those illustrated in FIGS. 2A and 2B. The device again comprises a chassis section 2 and a cutting assembly 3. The chassis 2 is equipped with a platform 21 and a drive track 7 to engage with a roof surface 4, here illustrated as being of steel composite construction. The cutting assembly 3 is connected to the chassis 2 by means of an arm 9. The cutting assembly 3 comprises two circular saw blades 10 (illustrated in FIG. 5A) mounted for rotational cutting movement about an axis 11 and driven by a power source 22. Also illustrated is a retaining mechanism 23 that may retain a portion of roof by e.g. magnetism or, as illustrated, by piercing a portion of the roof by use e.g. of a screw or auger configuration to allow the plug of roof material that is cut away to be retained and manipulated by the device. As well as being mounted for translational movement along the plane of the roof to allow cuts to be made as described above, the cutting mechanism is also mounted for translational movement towards and away from the roof surface to allow the blades to cut through the roof structure, and then be moved away from the plane of the roof to allow the cutting assembly 2 to be repositioned.

FIG. 5B illustrates the device in operation once the hole 5 has been cut into the roof surface 4. For clarity, the cutters have not been illustrated in FIG. 5B. It can be seen that the retaining mechanism 23 may be moved away from the plane of the roof surface, pulling the plug of retained roof material 24 with it, thereby allowing smoke and hot gases to escape from the hole 5.

Figure 6A:
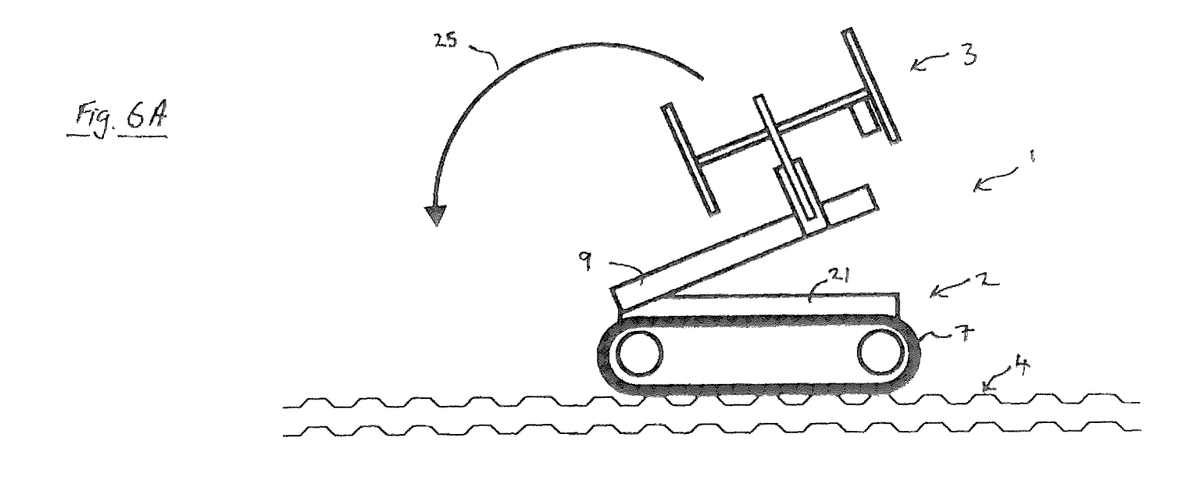
Figure 6B:
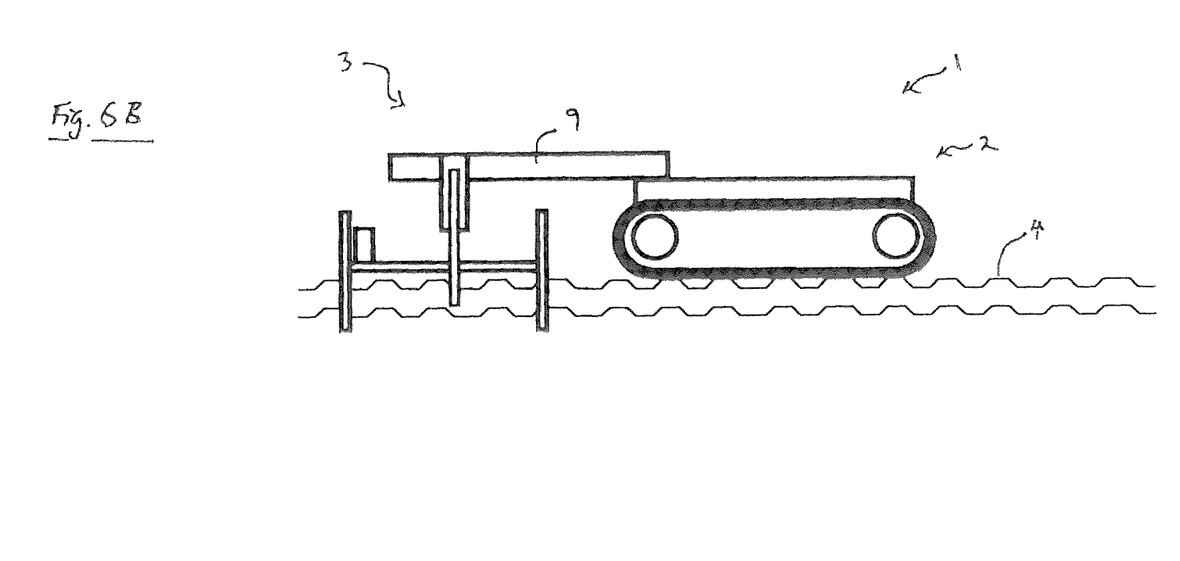

FIGS. 6A and 6B illustrate a further embodiment of a device of the invention, generally indicated by 1. Elements of the device corresponding to already-described embodiments are correspondingly numbered. The device 1 again comprises a chassis portion 2 and a cutting assembly 3. In this embodiment, the cutting assembly 3 is connected to the chassis 2 by an arm 9 mounted for hinging movement relative to the chassis 2 in a direction illustrated by the arrow 25. In this way, the cutting assembly may be moved into position for cutting (as illustrated in FIG. 6B) and may further be moved relative to the plane of the roof surface 4 by the action of the swinging arm 9. The illustrations show a cutting assembly similar to that shown in FIGS. 2 and 5, but it will be appreciated that such a hinged connection can also readily be combined with a cutting assembly of the type illustrated in FIG. 4.

A further advantage of the use of a hinged connection between the chassis 2 and the cutting assembly 3 is that the cutting assembly can readily be brought into it operating position against a part of a roof structure that is not parallel to the roof structure on which the chassis is engaged. For example, it may be brought into cutting engagement with a vertical section of roof whilst the chassis is sitting on an adjacent sloped or flat portion of the roof. In these circumstances, the use of a roof engaging stabiliser on the cutting assembly is particularly preferred, in order to transmit the forces generated by the cutting operation to be transferred to the surrounding roof surface.

Figure 7:
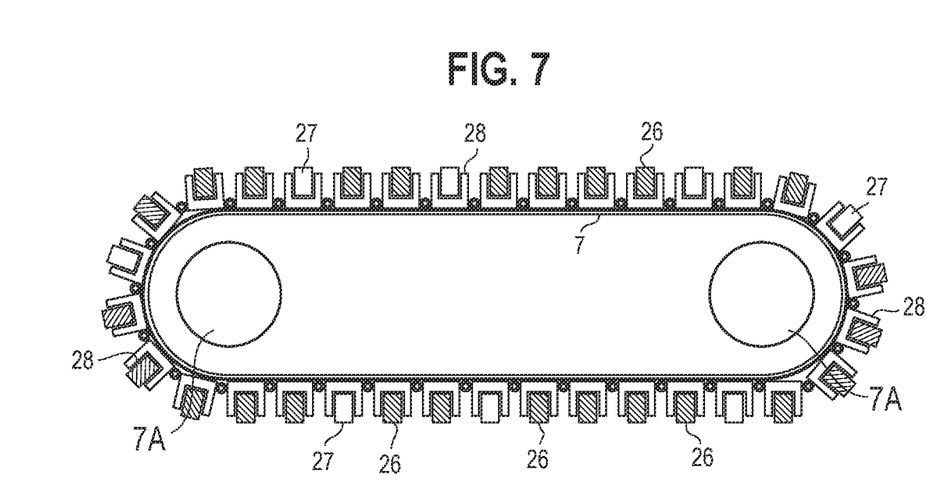
FIG. 7 illustrates a cross-sectional view of a track for use in a device of the invention.

FIG. 7 illustrates in schematic cross-sectional view a particularly preferred embodiment of a track 7 for use with a device of the present invention. Regions of the track are provided with high friction material 26 (illustrated by the hatched areas) such as rubber or a synthetic and preferably elastomeric material to provide greater grip on a roof surface. Further regions are provided with magnetic portions 27 (illustrated by the non-hatched areas) for providing releasable attachment to a magnetically-responsive roof surface. The magnetic or high friction portions 27, 26 may preferably be removably-mounted within pockets 28 such that they may be replaced if damaged, or the configuration changed to suit particular roof constructions by e.g. only using high-friction portions for non-magnetically responsive roofs.

Figure 8:
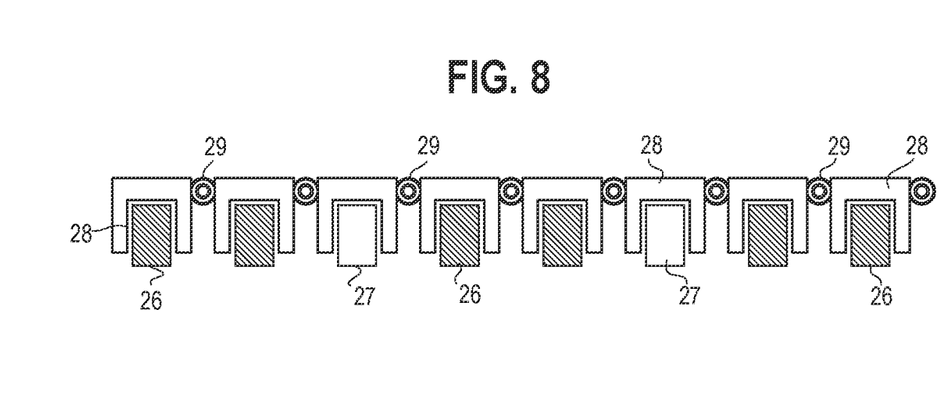
FIG. 8 shows a close-up view of a portion of FIG. 7.

A portion of the track structure is shown enlarged in FIG. 8 to illustrate that the pockets 28 can be connected to each other by a hinge mechanism 29 to allow them to articulate around the drive axles 7A (see FIG. 7) of the track mechanism.

In any embodiment of the invention, it is preferred to provide cooling means to cool the cutting blades, for example by the provision of a flow of cooling fluid in a stream or spray to the blades or the regions surrounding the blades. The cooling mechanism is not illustrated in FIGS. 1-8 for reasons of clarity.

Figure 9:
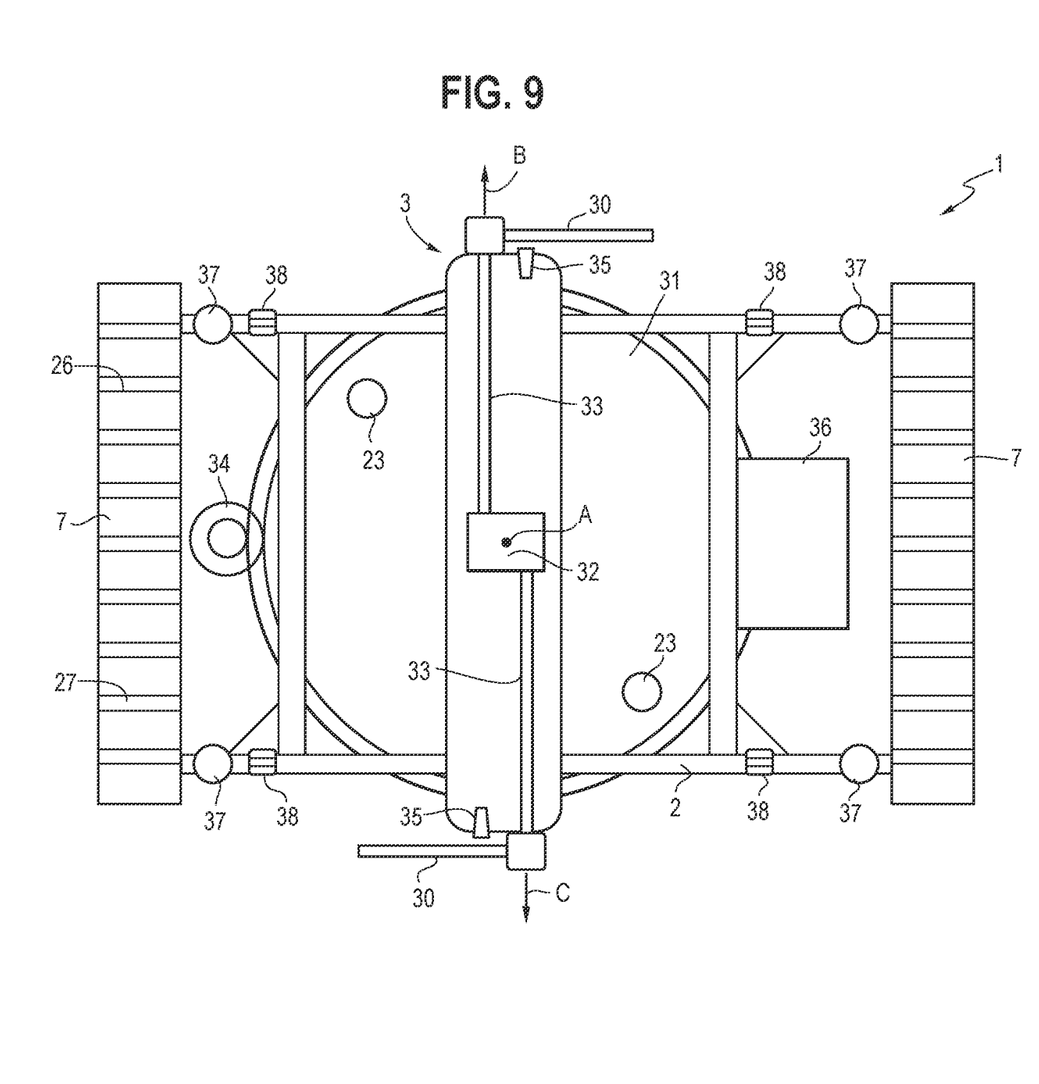
FIG. 9 illustrates a plan view of an embodiment of the invention.

FIG. 9 illustrates, in schematic plan view, an embodiment of a ventilation device of the present invention, generally indicated by 1. The device has a chassis member 2 that supports the various components of the system that will be described. The system provided with a drive system including two drive tracks 7, as previously described. The drive tracks 7 may be provided with magnetic elements 26 or high friction elements 27 to aid grip to a roof surface 4. In alternative embodiments, rather than providing tracks 7, roof-engaging skids may be provided so that the device may be simply lowered onto a roof surface where required, rather than providing a device capable of independent, remote-controlled locomotion.

In the embodiment illustrated, the cutting assembly 3 includes a pair of chain saws 30 mounted on opposite sides of a rotatable platform 31. As shown in FIG. 9 and previously described, the rotatable platform 31 of the cutting assembly 3 is supported by the chassis member 2 so that the rotatable platform 31 is rotatable with respect to the chassis about an axis of rotation A. A common chain saw drive unit 32 may be provided to power the chain saw blades via drive shafts 33. In this instance, it is preferable that gearing is provided from the common drive unit 32 such that the drive shafts 33 contra-rotate such that the operational rotation (i.e. the movement of the cutting chain with respect to the chain saw body) of each individual chain saw 30 is in the same direction with respect to the translational movement of the saw. As shown in FIG. 9, the chain saws 30 are mounted on opposite sides of the rotatable platform 31. Thus, when the rotatable platform 31 rotates about the axis of rotation A, the chainsaws 30 will rotate in unison with the rotatable platform 31 about the axis of rotation A. In addition, one chain saw 30, as a whole, rotates about an axis B that is aligned with the rotation axis of the drive shaft 33 that engages the chain saw 30. Similarly, the other chain saw 30, as a whole, rotates about an axis C that is aligned with the rotation axis of the other drive shaft 33 that engages the chain saw 30. As shown in FIG. 9, the axes B and C are parallel and offset with respect to each other. Also, as shown in FIG. 9, the axes B and C are not parallel or coincident with axis A. Alternatively, each saw may be independently powered. The platform 31 is mounted for rotation, driven e.g. by a slew drive 34. The chain saws 30 are mounted for rotation relative to the platform 31 about axes B and C so that they may be moved between a stowed position and a cutting position as required. This is more clearly shown in FIG. 10.

A retaining mechanism 23 is also provided to retain the portion of roof to be cut away. This may be e.g. in the form of a magnetic (preferably electromagnetic, and preferably remotely-operable) clamp, or a screw or auger assembly to pierce and retain a portion of roof material.

Cooling fluid may be provided from a cooling fluid reservoir (not illustrated) to nozzles 35 positioned to deliver cooling fluid onto the saw blades.

A lifting mechanism in the form of rams 37 is also provided to move the saws 30 up and down relative to the roof surface. This may be accomplished by using the rams to move the platform 31 up and down. In order to provide a large force, hydraulic rams are preferred as a lifting mechanism, although other mechanisms could be employed, such as a rack and pinion arrangement.

Lifting eyes 38 are also provided, to allow the device to be moved onto a roof by use of a hoist.

Power and control for the device is provided by a power and control unit 36. As previously discussed, the device is configured to be remotely operable with remotely-controlled functions including locomotion of the device (where a drive mechanism is provided), operation of the saws 30 to turn them on and off and swing them between a stowed and a cutting position, operation of the cooling fluid system; operation of the rams 37. In addition, a camera may be provided to allow an operator to remotely view operation of the device. Preferably the camera is on a remotely-controlled mount to allow it to be moved to a required field of view. Infra-red and night vision cameras may be usefully provided to allow visibility through smoke, and in the dark.

Figure 10:
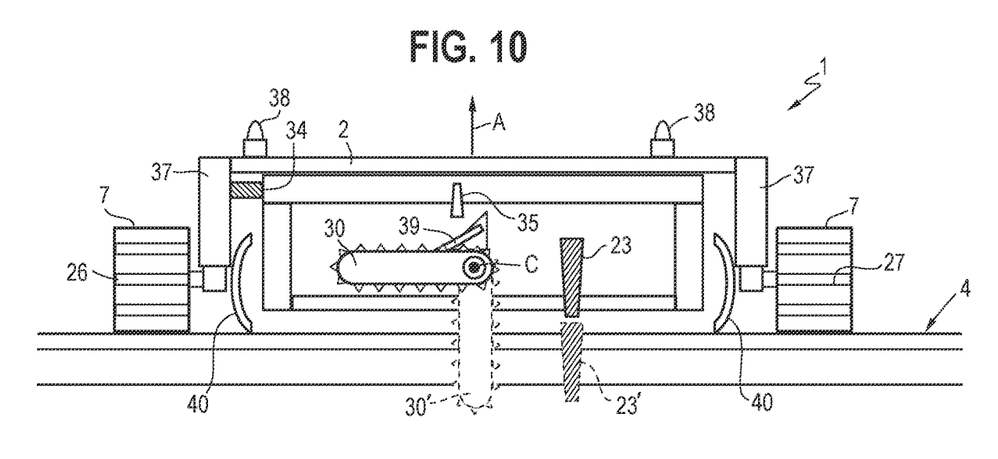
FIGS. 10 and 11 illustrate a side view of an embodiment of the invention.

FIG. 10 illustrates, as a schematic elevation view, the device 1 illustrated in FIG. 9, located on a roof surface 4. Elements of the system described in FIG. 9 are correspondingly numbered. FIG. 10 illustrates how the chain saw 30 may be swung round, via rotations as a whole about axes B and C, to a cutting position indicated by the dotted outline 30'. This may be effected by e.g. a hydraulic ram 39. FIG. 10 also illustrates the roof retaining mechanism 23 (illustrated as an auger), and how this may be brought into a roof-engaging position illustrated by 23'. In the embodiment illustrated in FIG. 10, heat deflectors 40 are also provided, adjacent the tracks 7, and outside of the cutting circle of the saw, to afford some protection to the device from hot gases released after cutting a ventilation hole.

Figure 11:
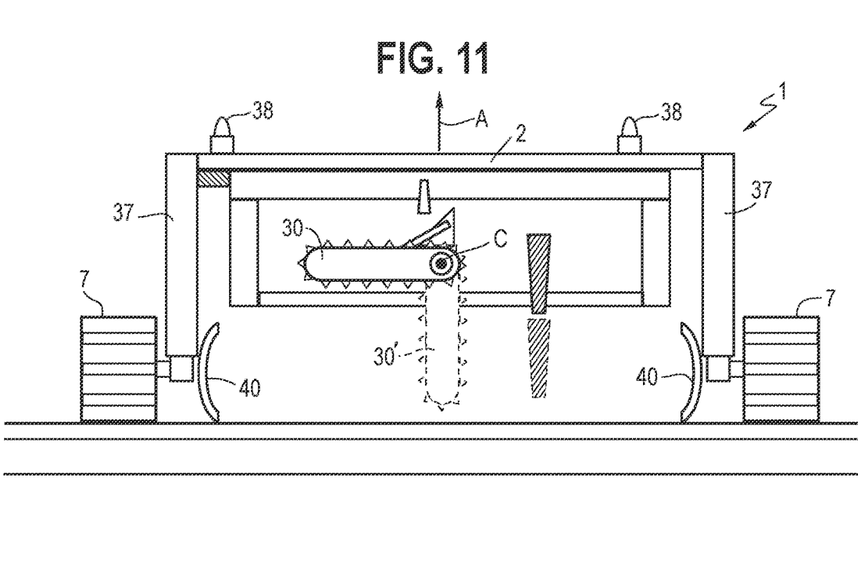

FIG. 11 illustrates the device of FIG. 10 where the rams 37 have been activated into an elevated configuration. This allows the saw 30 to be withdrawn from the cut line should it get stuck, or alternatively to allow a plunging cut to be made by elevating the platform as illustrated in FIG. 11, bringing the saws into a cutting position 30' from a stowed position 30, via rotations as a whole about axes B and C, and then lowering the platform.

Figure 12:
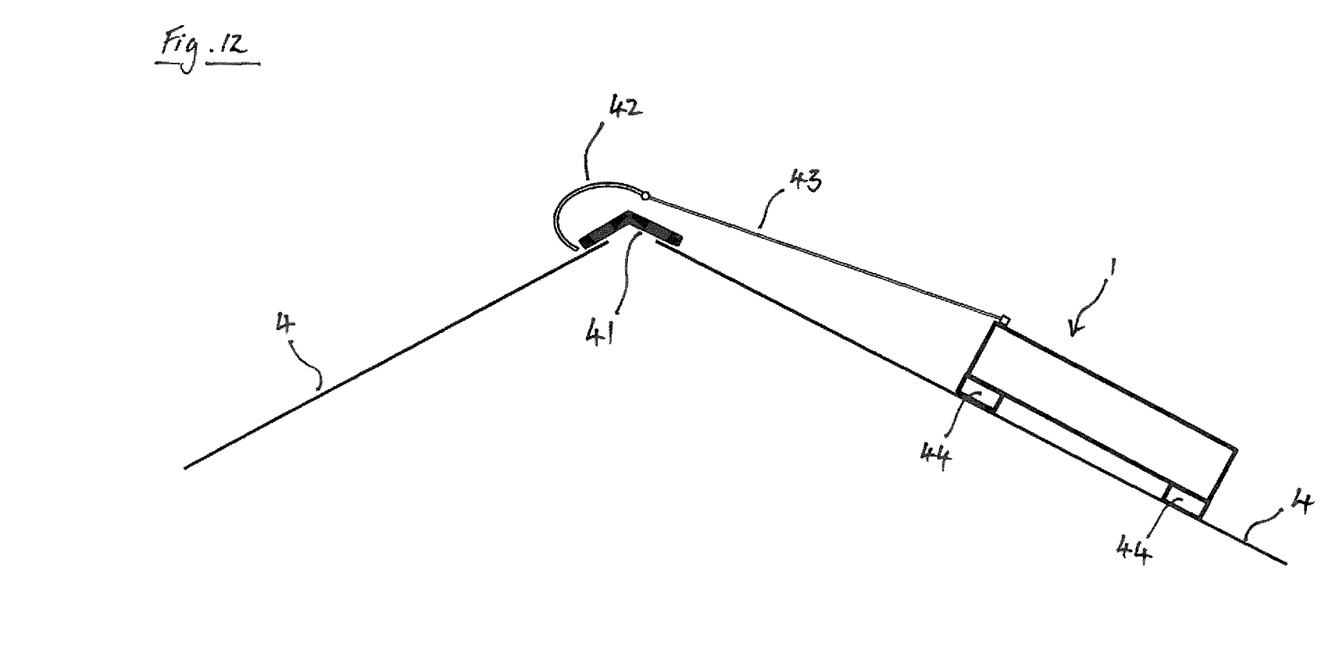
FIG. 12 illustrates an embodiment of the invention on a sloping roof surface.

FIG. 12 illustrates, in schematic side view, and embodiment of a ventilation device 1 mounted on a sloping roof surface 4, the roof having a ridge 41. The device 1 is provided with a roof-engaging element in the form of a ridge hook 42 that is attached to the device by a tether, in the form of a cable 43. In this embodiment, the device is provided with roof-engaging skids 44, rather than a drive mechanism. Other details of the device 1 are not illustrated, for clarity.

The invention claimed is:

1. A method of ventilating a burning building comprising:
positioning a device on a roof of a burning building for ventilating the burning building, the device comprising:
a chassis; and
a cutting assembly mounted on the chassis wherein the cutting assembly comprises:
a platform that rotates so as to define a circle of rotation;
a first chain saw mounted on the platform at a first side of the platform and mounted for first rotational displacement, as a whole, about a first axis that is substantially perpendicular to the roof so that the first chain saw rotates along the circle of rotation with respect to the chassis, and for first rotational movement of the first chain saw, as a whole, with respect to the platform about a first axis of rotation not related to rotation of the platform;
a second chain saw mounted on the platform at a second side of the platform opposite to the first side of the platform and mounted for second rotational displacement, as a whole, about the first axis that is substantially perpendicular to the roof so that the second chain saw rotates along the circle of rotation with respect to the chassis, and for second rotational movement of the second chain saw, as a whole, with respect to the platform about a second axis of rotation not related to rotation of the platform; and
the method further comprising causing the first chain saw and the second chain saw to form a hole in the roof of the burning building.

* * * * *